United States Patent
Evans

(10) Patent No.: US 7,864,980 B2
(45) Date of Patent: Jan. 4, 2011

(54) VIDEO MOTION ANOMALY DETECTOR

(75) Inventor: Richard John Evans, Winchester (GB)

(73) Assignee: Roke Manor Research Limited, Romsey (GB)

( * ) Notice: Subject to any disclaimer, the term of this patent is extended or adjusted under 35 U.S.C. 154(b) by 421 days.

(21) Appl. No.: 10/524,554

(22) PCT Filed: Jul. 9, 2003

(86) PCT No.: PCT/GB03/02963
§ 371 (c)(1),
(2), (4) Date: Sep. 7, 2005

(87) PCT Pub. No.: WO2004/017273
PCT Pub. Date: Feb. 26, 2004

(65) Prior Publication Data
US 2006/0109341 A1    May 25, 2006

(30) Foreign Application Priority Data
Aug. 15, 2002 (GB) .................................. 0218982.7
Nov. 18, 2002 (GB) .................................. 0226832.4

(51) Int. Cl.
*G06K 9/00* (2006.01)
(52) U.S. Cl. ...................... 382/103; 382/107; 348/154; 348/169
(58) Field of Classification Search .................. 382/103, 382/107; 348/154, 169–172
See application file for complete search history.

(56) References Cited

U.S. PATENT DOCUMENTS

| 4,198,653 | A | * | 4/1980 | Kamin | 348/155 |
| 5,374,932 | A | * | 12/1994 | Wyschogrod et al. | 342/36 |
| 5,546,474 | A | * | 8/1996 | Zuniga | 382/176 |
| 6,236,736 | B1 | | 5/2001 | Crabtree et al. | |
| 6,411,328 | B1 | * | 6/2002 | Franke et al. | 348/149 |
| 7,058,205 | B2 | * | 6/2006 | Jepson et al. | 382/103 |
| 2003/0048926 | A1 | * | 3/2003 | Watanabe | 382/103 |

FOREIGN PATENT DOCUMENTS

EP    0 933 726 A    8/1999

OTHER PUBLICATIONS

Schwerdt et al., "Visual Recognition of Emotional States", 2000, ICMI 2000, 41-48.*
Lou et al., "Semantic Interpretation of Object Activities in a Surveillance System", 2002, IEEE, 777-780.*
Owens et al., "Application of the Self-Organising Map to Trajectory Classification", 2000, IEEE, 1-7.*
Owens et al., "Novelty Detection in Video Surveillance Using Hierarchical Neural Networks", Jan. 2002, Springer, 1249-1254.*

* cited by examiner

*Primary Examiner*—Vikkram Bali
*Assistant Examiner*—Katrina Fujita
(74) *Attorney, Agent, or Firm*—Crowell & Moring LLP

(57) ABSTRACT

The Video Motion Anomaly Detector addresses the problem of automatically detecting events of interest to operators of CCTV systems used in security, transport and other applications, processing CCTV images. The detector may be used in a number of ways, for example to raise an alarm, summoning a human operator to view video data, or to trigger selective recording of video data or to insert an index mark in recordings of video data.

13 Claims, 1 Drawing Sheet

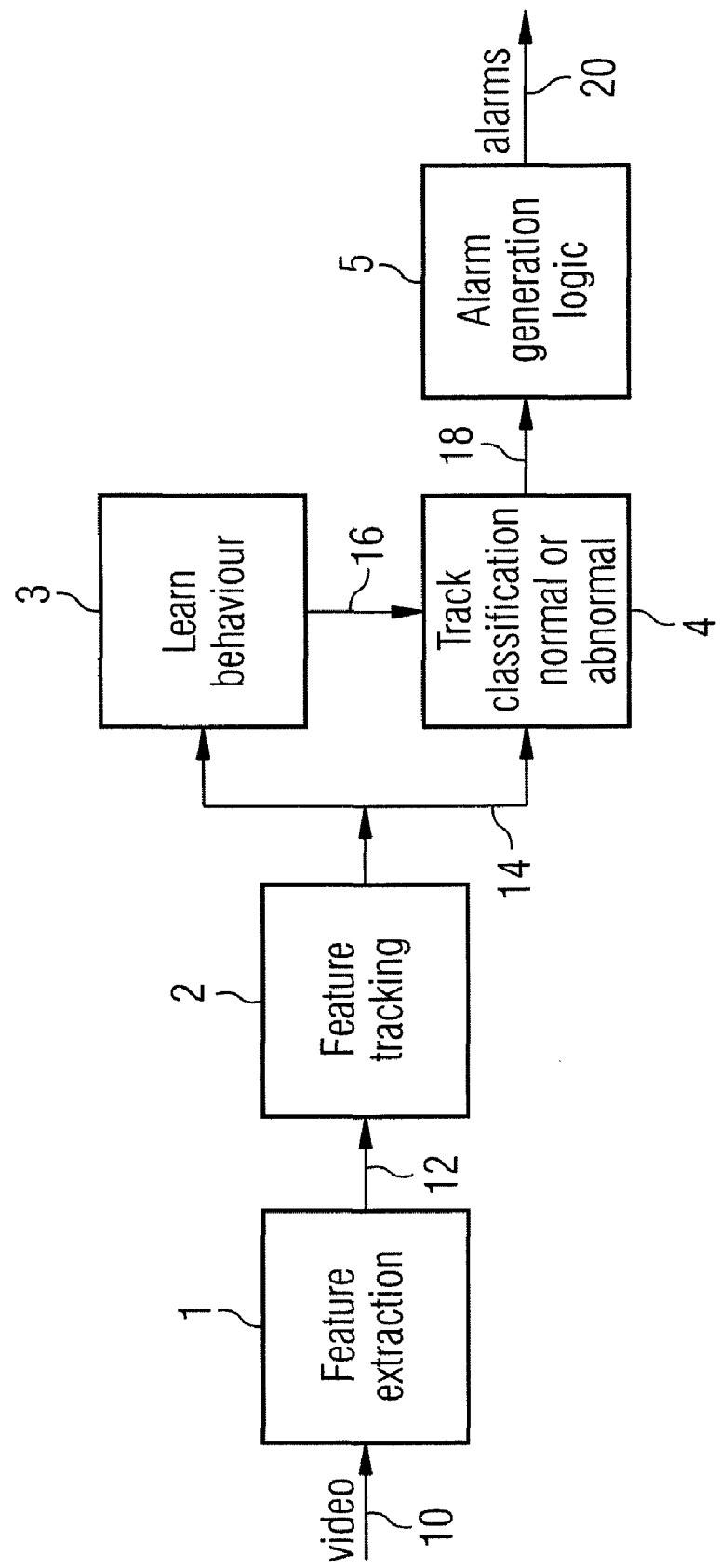

VIDEO MOTION ANOMALY DETECTOR

This application is a national stage of PCT International Application No. PCT/GB2003/002963, filed Jul. 9, 2003, which claims priority under 35 U.S.C. §119 to British Patent Application No. 0218982.7, filed Aug. 15, 2002, the entire disclosure of which is herein expressly incorporated by reference.

The present invention relates to devices and methods for processing video images to raise an alarm signal when an event of interest is detected.

BACKGROUND OF THE INVENTION

Closed circuit television (CCTV) is widely used for security, transport and other purposes. Example applications include the observation of crime or vandalism in public open spaces or buildings (such as hospitals and schools), intrusion into prohibited areas, monitoring the free flow of road traffic, detection of traffic incidents and queues, detection of vehicles travelling the wrong way on one-way roads.

The monitoring of CCTV displays (by human operators) is a very laborious task however and there is considerable risk that events of interest may go unnoticed. This is especially true when operators are required to monitor a number of CCTV camera outputs simultaneously. As a result in many CCTV installations, video data is recorded and only inspected in detail if an event is known to have taken place. Even in these cases, the volume of recorded data may be large and the manual inspection of the data may be laborious. Consequently there is a requirement for automatic devices to process video images and raise an alarm signal when there is an event of interest. The alarm signal can be used either to draw the event to the immediate attention of an operator, to place an index mark in recorded video or to trigger selective recording of CCTV data.

Some automatic event detectors have been developed for CCTV systems, though few of these are very successful. The most common devices are called video motion detectors (VMDs) or activity detectors, though they are generally based on simple algorithms concerning the detection of changes in the brightness of the video image—not the actual movement of imaged objects. For the purposes of detecting changes in brightness, the video image is generally divided into a grid of typically 16 blocks horizontally and vertically (i.e. 256 blocks in total). There several disadvantages of these algorithms. For example, they are prone to false alarms, for example when there are changes to the overall levels of illumination. Furthermore, they are unable to detect the movement of small objects, because of the block-based processing. In addition, they cannot be applied if the scene normally contains moving objects which are not of interest. These disadvantages can be reduced to a limited extent by additional processing logic, but the effectiveness of standard VMDs is inherently limited by the use of change detection as the initial image-processing stage.

There is another type of detection device, which is characterised by the use of complex algorithms involving image segmentation, object recognition and tracking and alarm decision rules. Though these devices can be very effective, they are generally expensive systems designed for use in specific applications and do not perform well without careful tuning and setting-up, and may not work at all outside of a limited range of applications for which they were originally developed.

U.S. Pat. No. 6,081,606 by inventors Wade & Jeffrey describes an apparatus and a method for detecting motion within an image sequence. That document discloses that motion within an image may be calculated by correlating areas of one image with areas of the next image in the video to generate a flow field. The flow field is then analysed and an alarm raised dependent on the observed magnitude and direction of flow.

European Patent No 0 986 912 describes a method for monitoring a predetermined surveillance region. A video image is divided into a number of segments. A statistical distribution for the mean grey level is determined for each segment. A change in mean grey level for a segment, outside the usual statistical variation, may be used to trigger an alarm.

SUMMARY OF THE INVENTION

The Video Motion Anomaly Detector addresses the problem of automatically detecting events of interest to operators of CCTV systems used in security, transport and other applications, processing CCTV images. The detector may be used in a number of ways, for example to raise an alarm, summoning a human operator to view video data, or to trigger selective recording of video data or to insert an index mark in recordings of video data.

Accordingly, the present invention provides a method for processing video images to detect an event of interest, comprising the steps of: receiving a video signal representing the video images to be processed; extracting at least one point feature from the video signal; tracking the position and movement of the at least one point feature within the video images to generate a corresponding at least one track, each representing a corresponding point feature; using an iterative learning process to derive a normal pattern of behaviour for each track; comparing present behaviour of the at least one track to the respective normal pattern of behaviour; and in response to the present behaviour falling outside the normal pattern of behaviour, generating an alarm signal.

The alarm signal may cause at least one of the following effects: draw the attention of an operator; place an index mark at the appropriate place in recorded video data; and trigger selective recording of video data.

The learning process may accumulate data representing the behaviour of the track(s) over a period of time in a four-dimensional histogram, said four dimensions representing x-position, y-position, x-velocity and y-velocity, of the track(s) within the video image. Furthermore, the learn behaviour stage may segregate the tracks according to a velocity threshold; wherein tracks moving at a velocity below the velocity threshold are considered stationary while tracks moving at a velocity in excess of the velocity threshold are considered mobile; wherein data concerning the mobile tracks is stored in said four-dimensional histogram, data concerning the stationary tracks being stored in a two-dimensional histogram, said two dimensions representing x-position and y-position within the video image. Furthermore, a cell size of the four-dimensional histogram may vary in accordance with a measured speed in the image of each respective track. The histogram may be periodically de-weighted in order to bias the result of the learning process towards more recent events.

The comparison process may classify a track according to a comparison of the frequency of occupation of the corresponding histogram cell with an occupancy threshold. The comparison process may act to classify as normal behaviour a track adjacent or near a cell which is above the occupancy threshold, despite the track appearing in a cell below the occupancy threshold, where one cell is considered to be near another if the distance between them is below a predetermined distance threshold.

Abnormal tracks may be filtered, whereby an active alarm signal is generated in response to an abnormal track which resembles a number of other abnormal tracks, in terms of at least one of position, velocity and time.

Abnormal tracks may be filtered, whereby an active alarm signal is generated in response only to an abnormal track which has been classified as abnormal on a predetermined number of occasions.

Abnormal tracks may be filtered, whereby an active alarm signal is generated in response only to a track being classified as abnormal for the first time.

Abnormal tracks may be filtered, whereby an active alarm signal is generated only in response to a filtered version of the classification rising above a predetermined threshold value.

Subsequent active alarm signals may be inhibited for a predetermined time interval after a first active alarm signal has been produced.

Subsequent active alarm signals may be inhibited if caused by an abnormal track within a predetermined distance of another track which has previously generated an alarm.

The present invention also provides apparatus for processing video images to detect an event of interest, comprising: a source of video images, producing a video signal representing the video images to be processed; a feature extraction device receiving the video signal and producing data representing at least one point feature detected within the image; a feature tracking device receiving the data representing point features and producing data representing tracks, being representative of the position and speed of each respective point feature, within the image; a learning device receiving the data representing the tracks and producing a signal representing a range of behaviour considered normal by the learning device, in response to operation of a learning process on the data representing the tracks; a classification device receiving both the signal representing the normal range of behaviour of the tracks and the data representing the tracks, being adapted to compare the signal and the data and to issue a normal/abnormal signal in accordance with the outcome of such comparison; and an alarm generation device receiving the normal/abnormal signal and generating at least one active alarm signal in response to the normal/abnormal signal indicating abnormal behaviour of at least one track.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic block diagram of a video motion anomaly detector according to the present invention.

DETAILED DESCRIPTION OF THE INVENTION

The present invention provides a video motion anomaly detector that is feature-based, and generates alarms on the basis of abnormal behaviour of a track representing the behaviour of a point feature. The known systems do not have these characteristics.

The video motion anomaly detector extracts and tracks point-like features in video images and raises an alarm when one or more track(s) each representing a feature is/are behaving abnormally compared with the behaviour of those tracks observed over a period of time. By "behaviour" we mean the movement of tracks in different parts of the video image. For example, rapid movement of features in a particular direction in one part of the field of view may be normal, but it may be abnormal if it occurred in another part of the field of view where the normal behaviour is slow movement. Similarly, rapid movement in the same part of the field of view may be abnormal if the movement is in a different direction.

FIG. 1 shows the main processing stages in the video motion anomaly detector.

An incoming video signal 10 is provided by a source of video images, for example a CCTV camera. The video signal 10 represents video images generated by the source of video images. Typically, the video images will show a view of an area surveyed by a CCTV security camera.

The video signal 10 is supplied to a feature extraction stage 1. The feature extraction stage 1 locates point-like features in each processed image in the video image sequence. A suitable feature extraction process is described in Patent No: GB2218507, "Digital Data Processing". The located features are identified in a signal 12 provided to the next stage, feature tracking stage 2.

The feature tracking stage 2 tracks features so that each point-like feature can be described by its current position and its estimated velocity in the image. The feature tracking stage 2 provides a track, that is a signal 14 indicating the current position and estimated velocity in the image, for each tracked feature, to a learn behaviour stage 3 and to a track classification stage 4.

The learn behaviour stage 3 accumulates information about the behaviour of features over a period of time. One way of doing this is to accumulate a four-dimensional histogram, the four dimensions of the histogram being x-position, y-position, x-velocity, y-velocity.

The track classification stage 4 classifies each track as being 'normal' or 'abnormal', as compared with the behaviour information accumulated by the learn behaviour stage 3 and provided by signal 16.

One way of classifying a track is to compare the frequency of occupancy of the corresponding histogram cell with a threshold. If the frequency of occupancy is below the threshold, the track is classified as abnormal, otherwise it is considered normal. The track classification stage 4 sends a normal/abnormal signal 18 to an alarm generation stage 5. If any of the tracked features show abnormal behaviour, then this signal will inform the alarm generation stage 5 of the abnormality.

The alarm generation stage 5 generates an alarm signal 20 in response to an active normal/abnormal signal 18, indicating that at least one abnormal track has been found to be present. Additional processing logic may be provided to resolve situations such as intermittent abnormal behaviour or multiple instances of abnormal behaviour associated with one real-world event, and other such situations.

The video motion anomaly detector of the present invention preferably provides at least one of the following features: the use of point feature extraction and tracking in an event detector; and the detection of events by classification of track behaviour as being abnormal, compared with the behaviour of tracks observed over time.

Compared with event detection based on a known video motion detection, the video motion anomaly detector of the present invention provides at least some of the following advantages.

It is based on point-feature extraction rather than detecting changes in image rightness. This makes the system of the invention relatively insensitive to changes in scene illumination levels. Scene illumination levels are major source of false alarms in known video motion detectors.

Because it is based on the detection of point features rather than block processing, the system of the invention is able to detect the movement of even relatively small objects, and to indicate an alarm condition if the movement is unusual.

The system of the invention accumulates information about the behaviour of each tracked feature, enabling it to build up a definition of 'normal' behaviour for each feature. The system of the invention can then detect movement of interest, that is, movement departing from 'normal' behaviour for that particular feature, even in the presence of other features moving 'normally'.

The system of the invention detects abnormal behaviour, that is, behaviour departing from the calculated 'normal' behaviour for a particular feature, rather than pre-defined specific behaviour. The invention may accordingly be applied to a very wide range of different applications with little special setting-up, and can adapt to long-term or permanent changes in the viewed image.

Compared with existing event detection systems based on complex software solutions, the video motion anomaly detector of the present invention is a relatively simple system suitable for implementation in relatively inexpensive hardware.

The main processing stages of the video motion anomaly detector are now described in more detail, with reference to FIG. 1.

FIG. 1 schematically shows the main processing stages in a video motion anomaly detector of the present invention, receiving video information 10, and producing an alarm signal 20.

The feature extraction stage 1 locates point-like features in each processed image in the video image sequence. A preferred feature extractor is described in Patent No: GB2218507, "Digital Data Processing" and this is further described by Harris and Stephens in the Proceedings of the 4th Alvey Vision Conference, September 1988, University of Manchester, "A combined corner and edge detector". An important aspect of this feature extractor is that it provides feature attributes, i.e. quantitative descriptions of the extracted features in addition to their position in the image. Compared with other point-feature extraction algorithms the Harris method is particularly robust.

Other point-feature extraction techniques have been developed, and could be used within the present invention. For example, one such technique is described by Moravec in Tech Report CMU-RI-TR-3, Carnegie-Mellon University, Robotics Institute, September 1980 "Obstacle avoidance and navigation in the real world by a seeing robot rover". Other ad hoc schemes can be envisaged.

Indeed, any algorithm that can be used to extract image features that can be associated with a locality can be used as a point-like feature extractor in the present invention. As examples, knot-points, that is to say points of high curvature on edge features, can be assigned a position. A feature such as an image region, for example an entire vehicle or person, segmented by edge-finding or region growing techniques, can be assigned the position of its centroid.

The feature extractor 1 may employ a fixed feature-strength threshold, in which case the number of extracted features may vary from frame to frame and it may vary from one application to another. Alternatively, the threshold may be varied so that a fixed number of features are extracted.

The feature tracking stage 2 tracks features between image frames so that each point-like feature can be described by its current position and its estimated velocity in the image.

In the present application a multi-target tracking algorithm is required as a scene may contain a large number of moving objects and each may give rise to a number of extracted features. For example, a car passing through the field of view may generate a number of extracted features on each video frame, depending on the spatial resolution used, and a traffic scene may contain a number of cars moving in different parts of the field of view. Tracking algorithms are themselves relatively well-known and understood. A treatise on the subject is given by Blackman & Popoli in "Design & Analysis of Modern Tracking Systems", Artech House 1999.

Tracking is a cyclic process. At any time, a number of objects may be being tracked. Their current position and velocity are known and as each new frame of video data is presented, the track information needs to be updated. Such a tracking algorithm typically consists of the following stages.

Plot (feature)-to-track association: this is the process of deciding which of the features, extracted from the most recent video frame, is the same object as that represented by any particular track. As "plot" rather than "feature" is the normal term used in discussion of tracking algorithms, "plot" will be used in this section of the description. A standard approach is to only consider for association plots that fall within a window or gate, which is centred on the plot's predicted position (see below). Many tracking algorithms then employ simple rules to handle situations where more than one plot falls in the acceptance gate. Example rules include 'associate the plot nearest to the predicted position', or 'associate neither'. These options will be discussed below. In the present application the density of plots is typically high and the possibility of plot-to-track association error is high so the preferred approach makes use of the similarity of plot (feature) attributes as well as plot position in making the plot-to-track association decision. Other schemes for resolving ambiguities are possible, for example probabilistic matching, multiple-hypothesis tracking and deferred decision making. Other refinements may be employed to improve performance, for example cross-correlation of image patches to confirm the similarity of imaged features, or variation of the acceptance window size according to the expected accuracy of prediction. This latter option will allow well established and slow moving tracks to have a smaller acceptance window than fast moving or newly formed tracks. Bi-directional matching schemes are also possible.

Track Maintenance: this is the process of initiating new tracks, typically because a new object has come into view, and deleting tracks, typically because a tracked feature is no longer in view. Most tracking algorithms will also have a track confirmation process for deciding whether a track is sufficiently well-established as to be the basis for subsequent decision making. In a preferred implementation, new tracks are initiated from plots that cannot be accounted for after plot-to-track association with existing tracks. Because of uncertainties in the performance of the feature extractor, tracks are not immediately deleted in the preferred implementation if they are not associated with any plot. Instead, a track may "coast" for a number of frames before deletion. Tracks are confirmed once they have been successfully associated with plots on a number of frames.

Tracking features of low feature strength is problematic, because they are not reliably detected on each video frame. Tracking errors become more common when the tracks are closely spaced. One way of reducing this problem is to ignore unmatched plots of a low feature-strength, and only initiate new tracks for unmatched plots of a higher feature-strength.

Track filtering and prediction: this is the process of estimating the current plot position and velocity, and predicting the expected plot position on subsequent image frames. This process is required because measurements of feature positions may be imperfect because of pixel quantisation and image noise, and objects may move appreciably between image frames. A number of methods are applicable, for example recursive Kalman or Alpha-Beta filtering, fitting polynomial splines to recent plot data etc. Performance here may be improved by a number of schemes, for example outlier removal and varying the order of a polynomial spline according the length of a track's history.

In general, tracking algorithms follow a common pattern though individual implementations may vary in detail according to application-specific factors and other issues.

The learn behaviour stage 3 accumulates information about the behaviour of tracks, representing tracked features, over a period of time. The preferred way of doing this is to accumulate a four-dimensional histogram, the four dimensions of the histogram being x-position, y-position, x-velocity, y-velocity. Alternatively, other co-ordinate systems might be used such as polar co-ordinates or Hough transform space co-ordinates, etc.

The behaviour histogram, being four-dimensional, may require a large amount of data storage and this may be impractical for implementation in processing hardware. The referred way of overcoming this problem is to partition the histogram into two sections. The first is for stationary tracks, i.e. very slow moving ones. This section is a two-dimensional histogram and so may use a fine cell size without requiring large amounts of storage. The second histogram section is for moving objects of different speeds. Although this is a four-dimensional histogram, a coarser cell size may be used for such objects so the size of this section of the histogram also need not be large. The size of the second partition may also be reduced by using a cell size which varies with speed.

There are a number of alternative ways of constructing the histogram to minimise memory requirements. These include quad tree and other sparse matrix representation techniques.

The histogram describing behaviour may be built up over a fixed period of time and remain unchanged thereafter. This has the disadvantage that slow changes in actual behaviour, drift in camera electronics or sagging of camera mounts etc, may ultimately result in normal behaviour being classified as abnormal. This may be overcome in a number of ways. In the preferred method, the histogram is periodically de-weighted by a factor close to unity, with the result that the system has a fading memory, i.e. its memory is biased towards most recent events. Depending on processor limitations, it may be necessary to implement the fading memory in ways to reduce processor load. For example, the de-weighting might be applied at a larger interval, or only a part of the histogram might be de-weighted at shorter intervals. Another way of biasing memory of behaviour to recent events, albeit not a fading memory, is to use two histogram stores, one being built up while the other is being used for track classification.

While histogramming is the preferred approach, there are other possible learning and classification methods, and some of these are discussed below.

The track classification stage 4 classifies each track as being 'normal' or 'abnormal' and the method used depends on how behaviour is being learnt in the learn behaviour stage 3. In the preferred histogram-based method, a track is classified by comparing the frequency of occupancy of the corresponding histogram cell with an occupancy threshold. If the frequency of occupancy is below the threshold, the track is classified as abnormal, otherwise it is considered normal.

If a very low false alarm rate is required, it may be necessary to take additional steps to prevent an adverse system response, particularly if the training time has been limited. As an example of such steps, a track may be classified as normal, even if the occupancy of the corresponding histogram cell is low, if it is adjacent or near an above threshold cell. The distance from the corresponding histogram cell to the nearest above occupancy threshold cell (measured within the histogram by city-block, Cartesian or some other metric which may be occupancy weighted) may be compared with a distance threshold. If the distance is less than the threshold, the track is classified as normal, otherwise the track is considered abnormal. The false alarm rate can be adjusted by varying the occupancy threshold and the distance threshold. As an alternative to the use of a distance threshold, histogram data might be blurred to suppress the classification of tracks as abnormal in cells close to high occupancy cells. Similarly, other morphological operators might be applied.

The alarm generation stage 5 generates an alarm signal 20 when abnormal tracks are found to be present, subject to additional processing logic to resolve situations such as intermittent abnormal behaviour or multiple instances of abnormal behaviour associated with one real-world event, and other situations such as when spurious track data is generated by a tracking error.

The risk of alarms being generated by spurious data can be reduced by limiting processing to confirmed tracks or tracks whose track history shows a consistent history of associated plots. Alarms generated by spurious data can also be reduced by limiting processing to either: abnormal tracks which occur in close proximity (in terms of any of: position, velocity or time) to a number of other abnormal tracks, and/or: tracks which are classified as abnormal on a number of occasions.

To prevent intermittent alarms, an alarm signal 20 can be raised (subject to other logic) only when a track is classified as abnormal for the first time, or when a filtered version of the classification rises above a threshold.

Multiple alarms might be generated, for example, if a vehicle viewed by the CCTV system takes an abnormal path and generates a number of separate abnormal tracks in the process—the different tracks being generated by different parts of the vehicle. These multiple alarms would be confusing and unwanted in a practical system. These can be suppressed by inhibiting alarms for a period of seconds after a first alarm. Alternatively, alarms could be suppressed if the track causing the alarm is within some distance of a track that has previously generated an alarm.

A number of different methods of alarm generation logic can be envisaged, with different ad hoc formulations.

The above sections describe preferred methods for use within the present invention, although alternative learning and classification methods may be used. A selection of such alternatives described below.

Fan-in/Fan-out (MLP) Neural Net. In outline, the idea is to use a multi-layer perceptron with 4 input nodes (for track data X, Y, Vx, Vy) and 4 output nodes, but an intermediate layer of 2 or 3 nodes. The perceptron is a program that learn concepts, i.e. it can learn to respond with True (1) or False (0) for inputs we present to it, by repeatedly "studying" examples presented to it. The Perceptron is a neural network whose weights and biases may be trained to produce a correct target vector when presented with the corresponding input vector. The training technique used is called the perceptron learning rule. The perceptron is able to generalise from its training vectors and work with randomly distributed connections. Perceptrons are especially suited for simple problems in pattern classification. The network would be trained to reconstruct its own input. Because of the internal constriction, the reconstruction should be better for "normal" tracks and worse for "abnormal" tracks. Thus, the accuracy of reconstruction could be used to assess the normality of the track.

Nearest Neighbour. Here, tracked feature data for recent frames is retained to create a track history database. Each new track is tested for normality by searching this database to find any similar previous tracks.

Pruned Nearest Neighbour. This is a variation of the full nearest neighbour technique. The history database is reduced in size by omitting duplicates or near duplicates of earlier data.

Kohonen Net. Although this is a neural net technique, this can be viewed as similar to the pruned nearest neighbour method. The behaviour of tracked objects is described by a set of nodes positioned in the four-dimensional input space. The actual positions of the nodes are determined by an iterative training process. This method is also related to adaptive codebook generation methods used in data compression systems.

Probabilistic Checking. This is a lateral approach to searching history databases for the nearest neighbour-based algorithms. Here, the history database is searched by choosing for comparison entries in a random sequence until a number of matches are found. If the track being checked is very normal, a number of matches will be found very quickly.

Accordingly, the present invention provides a video motion anomaly detector which addresses the problem of automatically detecting events of interest to operators of CCTV systems used in security, transport and other applications, by processing CCTV images. The detector may be used, for example, to activate an alarm to summon a human operator to view video data, to trigger selective recording of video data or to insert an index mark in recordings of video data. The video motion anomaly detector of the present invention extracts and tracks point-like features in video images and raises an alarm when a feature is behaving abnormally, compared with the 'normal' behaviour of those features, derived from observations of that feature over a period of time.

Existing video motion detectors are devices which are essentially based on detecting changes in image brightness averaged over image sub-blocks. The video motion anomaly detector of the present invention has the advantage of being less prone to false alarms caused by changes in scene illumination levels. The detector of the present invention can also detect the movement of smaller objects and detect movements of interest, even in the presence of other moving objects. Further, it can be applied to a very wide range of different applications with little special setting. Compared with other existing event detection systems based on complex software solutions, the video motion anomaly detector can be implemented in relatively inexpensive hardware.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for a video motion anomaly detector for processing video images to detect an event of interest, comprising the steps of:

receiving, by the video motion anomaly detector, a video signal representing the video images to be processed;

extracting, by the video motion anomaly detector, at least one point feature from the video signal;

tracking, by the video motion anomaly detector, the position and movement of the at least one point feature within the video images to generate a corresponding at least one track, each of said at least one track representing a corresponding point feature in terms of its position and its velocity within each of the video images;

using, by the video motion anomaly detector, an iterative learning process to derive a normal pattern of behavior for each position within the video images in terms of observed incidences of point feature velocity at said each position, wherein the learning process accumulates data representing the behavior of the track(s) over a period of time in a four-dimensional histogram, said four dimensions representing x-position, y-position, x-velocity and y-velocity, of the track(s) within the video images;

comparing, by the video motion anomaly detector, present behavior of a track at a certain position within the video images to the respective derived normal pattern of behavior at the certain position in terms of observed point feature velocity at the certain position, wherein the comparison process classifies a track as normal according to a comparison of the frequency of occupation of a histogram cell representing a corresponding position and velocity within the video images with an occupancy threshold; and in response to the present behavior falling outside the normal pattern of behavior in terms of observed point feature velocity at the certain position, the video motion anomaly detector generates an alarm signal.

2. The method according to claim 1, wherein the alarm signal causes at least one of the following effects:

draw the attention of an operator;

place an index mark at the appropriate place in recorded video data; and trigger selective recording of video data.

3. The method according to claim 1, wherein:

the learn behavior stage segregates the tracks according to a velocity threshold;

tracks moving at a velocity below the velocity threshold are considered stationary while tracks moving at a velocity in excess of the velocity threshold are considered mobile;

data concerning the mobile tracks is stored in said four-dimensional histogram; and data concerning the stationary tracks is stored in a two-dimension histogram representing x-position and y-position within the video image.

4. The method according to claim 1, wherein a cell size of the four-dimensional histogram varies with speed.

5. The method according to claim 1, wherein the histogram is periodically de-weighted in order to bias the result of the learning process towards more recent events.

6. The method according to claim 1, wherein the comparison process acts to classify as normal behavior a track corresponding to a histogram cell which is adjacent or near a histogram cell which is above the occupancy threshold, despite the track corresponding to a histogram cell which is below the occupancy threshold, where one histogram cell is considered to be near another if the distance between them is below a predetermined distance threshold.

7. The method according to claim 1, wherein abnormal tracks are filtered, whereby an active alarm signal is generated in response to an abnormal track which resembles a number of other abnormal tracks, in terms of at least one of position, velocity and time.

8. The method according to claim 1, wherein abnormal tracks are filtered, whereby an active alarm signal is generated in response only to an abnormal track which has been classified as abnormal on a predetermined number of occasions.

9. The method according to claim 1, wherein abnormal tracks are filtered, whereby an active alarm signal is generated in response only to a track being classified as abnormal for the first time.

10. The method according to claim 1, wherein abnormal tracks are filtered, whereby an active alarm signal is generated only in response to a filtered version of a classification as abnormal rising above a predetermined threshold value.

11. The method according to claim 1, wherein subsequent active alarm signals are inhibited for a predetermined time interval after a first active alarm signal has been produced.

12. The method according to claim 1, wherein subsequent active alarm signals are inhibited if caused by an abnormal track within a predetermined distance of another track which has previously generated an alarm.

13. Apparatus for processing video images to detect an event of interest, comprising:
- a source of video images which produces a video signal representing the video images to be processed;
- a feature extraction device that receives the video signal, and produces data representing at least one point feature detected within the video images;
- a feature tracking device that receives the data representing said at least one point feature, and produces data representing a track that is representative of position and velocity of each of said at least one point feature within the image;
- a learning device that receives the data representing tracks of said at least one point feature, and derives a normal range of behavior of each position within the video images in terms of observed incidences of point feature velocity at said each position in response to operation of a learning process on the data representing the tracks, wherein the learning device accumulates data representing the behavior of the track(s) over a period of time in a four-dimensional histogram, said four dimensions representing x-position, y-position, x-velocity and y-velocity, of the track(s) within the video images;
- a classification device that receives both a signal representing the normal range of behavior and the data representing the tracks, and is adapted to compare the signal and the data for a corresponding position within the video images and to issue a normal/abnormal signal in accordance with the outcome of such comparison, wherein the classification device classifies a track as normal according to a comparison of the frequency of occupation of a histogram cell representing a corresponding position and velocity within the video images with an occupancy threshold; and
- an alarm generation device that receives the normal/abnormal signal and generates at least one active alarm signal in response to the normal/abnormal signal indicating abnormal behavior of at least one track.

\* \* \* \* \*